(12) United States Patent
Jackson et al.

(10) Patent No.: US 6,728,863 B1
(45) Date of Patent: Apr. 27, 2004

(54) WIDE CONNECTIONS FOR TRANSFERRING DATA BETWEEN PE'S OF AN N-DIMENSIONAL MESH-CONNECTED SIMD ARRAY WHILE TRANSFERRING OPERANDS FROM MEMORY

(75) Inventors: James H. Jackson, Cary, NC (US); Thomas D. Kraus, Newtonville, MA (US)

(73) Assignee: Assabet Ventures, Maynard, MA (US)

( * ) Notice: Subject to any disclaimer, the term of this patent is extended or adjusted under 35 U.S.C. 154(b) by 707 days.

(21) Appl. No.: 09/696,439

(22) Filed: Oct. 25, 2000

Related U.S. Application Data
(60) Provisional application No. 60/161,587, filed on Oct. 26, 1999.

(51) Int. Cl.$^7$ ............................................. G06F 15/80
(52) U.S. Cl. ........................... 712/14; 712/11; 712/22
(58) Field of Search ............................ 712/11, 14, 22

(56) References Cited

U.S. PATENT DOCUMENTS

| | | | |
|---|---|---|---|
| 4,270,169 A | 5/1981 | Hunt et al. | |
| 4,270,170 A | 5/1981 | Reddaway | |
| 4,621,339 A | 11/1986 | Wagner et al. | 364/900 |
| 4,720,780 A | 1/1988 | Dolecek | |
| 4,727,503 A | 2/1988 | McWhirter | |
| 4,985,832 A | 1/1991 | Grondalski | 364/200 |
| 4,992,933 A | 2/1991 | Taylor | 364/200 |
| 5,038,386 A | 8/1991 | Li | |
| 5,133,073 A | 7/1992 | Jackson et al. | 395/800 |
| 5,157,785 A | 10/1992 | Jackson et al. | 395/800 |
| 5,164,913 A | 11/1992 | Guilfoyle et al. | |
| 5,165,023 A | 11/1992 | Gifford | 395/325 |
| 5,179,714 A | 1/1993 | Graybill | 395/800 |
| 5,193,202 A | 3/1993 | Jackson et al. | 395/800 |
| 5,212,777 A | 5/1993 | Gove et al. | 395/375 |
| 5,239,654 A | 8/1993 | Ing-Simmons et al. | 395/800 |
| 5,253,308 A | 10/1993 | Johnson | 382/49 |
| 5,371,896 A | 12/1994 | Gove et al. | 395/800 |
| 5,410,727 A | 4/1995 | Jaffe et al. | |
| 5,450,604 A | 9/1995 | Davies | 395/800 |
| 5,457,789 A | 10/1995 | Dietrich, Jr. et al. | 395/427 |
| 5,471,627 A | 11/1995 | Means et al. | |
| 5,535,410 A | 7/1996 | Watanabe et al. | 395/800 |
| 5,577,262 A | 11/1996 | Pechanek et al. | 395/890 |
| 5,581,773 A | 12/1996 | Glover | 395/800 |
| 5,588,152 A | 12/1996 | Dapp et al. | 395/800 |

(List continued on next page.)

OTHER PUBLICATIONS

A Reconfugurable Processor Array with Routing LSIs and General Purpose DSPs; Jacob Levison, et al.; pp. 102–116; IEEE 1992.

A Single–Chip, 1.6 Billion, 16–b MAC/s Multiprocessor DSP; B. Ackland, et al.; pp. 412–424; IEEE Journal of Solid–State Circuits; vol. 35 No. 3; Mar. 2000.

A 450–MHz RISC Microprocessor with Enhanced Instruction Set and Copper Connect; Carmine Nicoletta; et al.; pp. 1478–1491; IEEE Journal of Sold–State Circuits; vol. 34 No. 11; Nov. 1999.

*Primary Examiner*—William M. Treat
(74) *Attorney, Agent, or Firm*—Weingarten, Schurgin, Gagnebin & Lebovici LLP

(57) ABSTRACT

A single-instruction multiple-data (SIMD) array processor providing enhanced data transfer efficiency. The SIMD array processor includes at least one memory and a plurality of mesh-connected processing elements configured in an array. Each processing element in the array includes at least one "narrow" memory buffer, at least one "wide" data register, and at least one "wide" communication register. The narrow memory buffer is adapted to transfer data serially between the memory and the wide data register, the wide data register is adapted to transfer data directly to the wide communication register, and the wide communication register is adapted to transfer data directly to the communication register of a neighboring processing element while the memory buffer is accessing data from the memory.

12 Claims, 3 Drawing Sheets

U.S. PATENT DOCUMENTS

| | | | |
|---|---|---|---|
| 5,590,356 A | 12/1996 | Gilbert | 395/800 |
| 5,630,162 A | 5/1997 | Wilkinson et al. | |
| 5,673,396 A | 9/1997 | Smolansky et al. | |
| 5,710,932 A * | 1/1998 | Hamanaka et al. | 712/14 |
| 5,717,943 A | 2/1998 | Barker et al. | 395/800 |
| 5,752,068 A | 5/1998 | Gilbert | 395/800.16 |
| 5,809,292 A | 9/1998 | Wilkinson et al. | |
| 5,822,608 A | 10/1998 | Dieffenderfer et al. | 395/800.2 |
| 5,842,031 A | 11/1998 | Barker et al. | 395/800 |
| 5,892,962 A | 4/1999 | Cloutier | |
| 5,933,650 A | 8/1999 | van Hook et al. | |
| 5,963,746 A | 10/1999 | Barker et al. | 395/800.2 |
| 6,038,580 A | 3/2000 | Yeh | 708/402 |
| 6,085,304 A | 7/2000 | Morris et al. | 712/22 |
| 6,185,667 B1 * | 2/2001 | Abercrombie et al. | 712/11 |
| 6,425,068 B1 * | 7/2002 | Vorbach et al. | 712/18 |

* cited by examiner

| Memory Cycle | M0 | YS0<br>11•••0 | NEWS00<br>3•••0 | NEWSI1<br>3•••0 | YS1<br>11•••0 |
|---|---|---|---|---|---|
| 1 | 1 | XXXXXXXXXXXX1 | XXXX | XXXX | XXXXXXXXXXXXX |
| 2 | 0 | XXXXXXXXXXX10 | XXXX | XXXX | XXXXXXXXXXXXX |
| 3 | 1 | XXXXXXXXXX101 | XXXX | XXXX | XXXXXXXXXXXXX |
| 4 | 0 | XXXXXXXXX1010 | XXXX | XXXX | XXXXXXXXXXXXX |
| 5 | 0 | XXXXXXXX10100 | XXXX | XXXX | XXXXXXXXXXXXX |
| 6 | 1 | XXXXXXX101001 | 1010 | XXXX | XXXXXXXXXXXXX |
| 7 | 0 | XXXXXX1010010 | 1010 | XXXX | XXXXXXXXXXXXX |
| 8 | 1 | XXXXX10100101 | 1010 | 1010 | XXXXXXXXXXXXX |
| 9 | 0 | XXXX101001010 | 1010 | 1010 | XXXXXXXX1010X |
| 10 | 0 | XXX1010010100 | 0101 | 1010 | XXXXXXX1010XX |
| 11 | 1 | XX10100101001 | 0101 | 1010 | XXXXXX1010XXX |
| 12 | 1 | X101001010011 | 0101 | 0101 | XXXXX1010XXXX |
| 13 | 1 | 1010010100011 | 0101 | 0101 | XXXX10100101X |
| 14 | X | XXXXXXXXXXXXX | 0011 | 0101 | XXX10100101XX |
| 15 | X | XXXXXXXXXXXXX | 0011 | 0011 | XX10100101XXX |
| 16 | X | XXXXXXXXXXXXX | 0011 | 0011 | X10100101XXXX |
| 17 | X | XXXXXXXXXXXXX | 0011 | 0011 | 1010010100011 |

*Fig. 3*

WIDE CONNECTIONS FOR TRANSFERRING DATA BETWEEN PE'S OF AN N-DIMENSIONAL MESH-CONNECTED SIMD ARRAY WHILE TRANSFERRING OPERANDS FROM MEMORY

CROSS REFERENCE TO RELATED APPLICATIONS

This application claims priority of U.S. Provisional Patent Application No. 60/161,587 filed Oct. 26, 1999 entitled FINITE DIFFERENCE ACCELERATOR.

STATEMENT REGARDING FEDERALLY SPONSORED RESEARCH OR DEVELOPMENT

N/A

BACKGROUND OF THE INVENTION

The present invention relates generally to SIMD array processors, and more specifically to SIMD array processors having improved data transfer efficiency between processing elements incorporated therein.

Single-Instruction Multiple-Data (SIMD) array processors are known which comprise multi-dimensional arrays of interconnected processing elements executing the same instruction simultaneously on a plurality of different data samples. For example, an SIMD array processor may include a two-dimensional array of processing elements in which each processing element is connected to its four (4) nearest neighboring processing elements to form a "North, East, West, South (NEWS) array". In such NEWS arrays, each processing element can communicate directly with its North, East, West, and South neighbors.

One aspect of the typical SIMD array processor that limits the rate at which the processing elements can communicate with each other is that one or more of the neighboring processing elements with which a particular processing element communicates may be physically located on a different Application Specific Integrated Circuit (ASIC) and/or on a different Printed Circuit Board (PCB). For example, when a processing element directly accesses a multi-bit data sample from a neighboring processing element physically located on a different ASIC or a different PCB, a significant amount of time may be required for that data sample to propagate between the ASIC's or PCB's. To account for this propagation time, communication registers used in processing elements of the typical SIMD array processor are generally clocked at relatively low speeds. However, clocking communication registers at such low speeds may cause many operating cycles of a processing element to be wasted while the processing element waits for the data transfer to complete. As a result, the typical SIMD array processor may not be suitable for some high-speed data processing applications.

It would therefore be desirable to have an SIMD array processor that has improved data transfer efficiency between processing elements incorporated therein. Such an SIMD array processor would transfer data samples more efficiently whether or not neighboring processing elements are located on the same ASIC or PCB.

BRIEF SUMMARY OF THE INVENTION

In accordance with the present invention, an SIMD array processor is provided in which data transfer efficiency is enhanced between processing elements included therein. The SIMD array processor includes a plurality of mesh-connected processing elements configured in a multi-dimensional array. Each processing element includes at least one "narrow" memory buffer, at least one "wide" data register, and at least one "wide" communication register. The narrow memory buffer is adapted to transfer data serially between a memory and the wide data register; and, the wide data register is adapted to transfer data directly to the wide communication register. Further, the wide communication register is adapted to transfer data directly to the communication register of a neighboring processing element while the memory buffer accesses data from memory. In a preferred embodiment, the memory buffer has a width of one (1) bit to allow bit-serial data transfer between the memory and the wide data register while the wide communication register transfers data in parallel to (from) the communication register of the neighboring processing element.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIG. 3 is a table depicting the contents of respective YS, NEWSO, and NEWSI registers of two (2) neighboring processing elements included in the SIMD array processor of FIG. 1, in an illustrative example of a data transfer between the two (2) processing elements.

DETAILED DESCRIPTION OF THE INVENTION

The entire disclosure of U.S. Provisional Patent Application No. 60/161,587 filed Oct. 26, 1999 is incorporated herein by reference.

Figure 1:
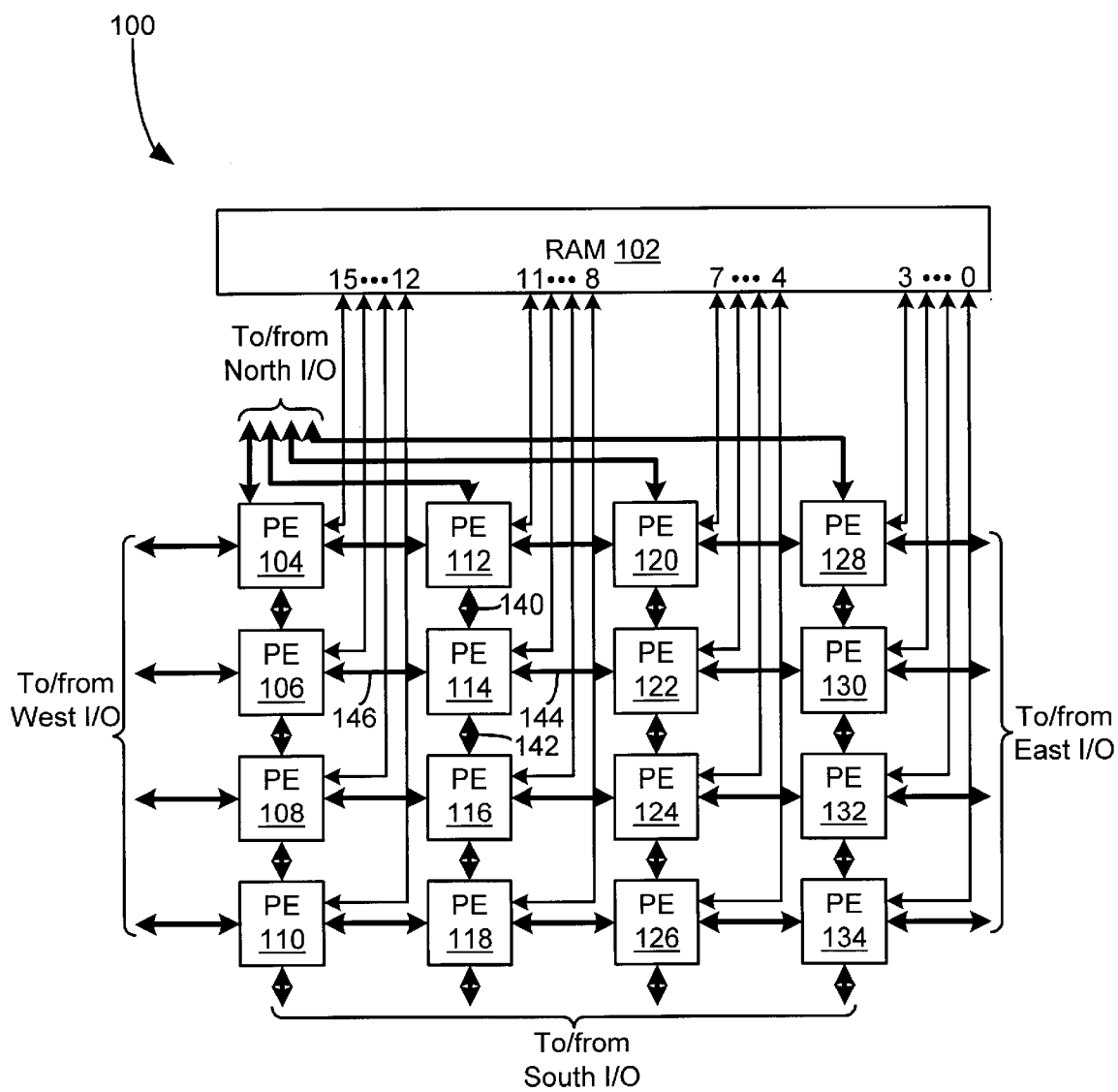
FIG. 1 is a block diagram depicting an SIMD array processor according to the present invention.

FIG. 1 is a block diagram depicting an illustrative embodiment of an SIMD array processor 100 in accordance with the present invention. The SIMD array processor 100 includes a plurality of identical Processing Elements (PE's) 104 through 134 interconnected in a mesh and configured as a two-dimensional NEWS array. The PE's 104 through 134 are communicably coupled to respective bi-directional Input/Output's (I/O's) 0 through 15 of a Random Access Memory (RAM) 102. In a preferred embodiment, the RAM 102 is a Synchronous Dynamic RAM (SDRAM).

Although FIG. 1 depicts the SIMD array processor 100 as including the two-dimensional NEWS array of PE's 104 through 134, it should be understood that the SIMD array processor 100 may comprise an array of PE's having one (1) or more dimensions. It should also be understood that the size of the array may be adjusted. In a preferred embodiment, the NEWS array of PE's is implemented on an ASIC comprising an 8×8 NEWS array. FIG. 1 depicts the SIMD array processor 100 as including a 4×4 NEWS array for clarity of discussion.

In a preferred embodiment, the PE's 104 through 134 are physically located on the same ASIC to form the NEWS array, thereby simplifying I/O connections between nearest neighboring PE's in the NEWS array. For example, relative to the PE 114, a "North" I/O 140 interconnects the PE 114 and the PE 112; an "East" I/O 144 interconnects the PE 114 and the PE 122; a "West" I/O 146 interconnects the PE 114 and the PE 106; and, a "South" I/O 142 interconnects the PE 114 and the PE 116. Further, the PE's 104, 106, 108, 110, 112, 118, 120, 126, 128, 130, 132, and 134 that are physically located along the edges of the NEWS array comprise suitable North, East, West, and South I/O's for connecting these PE's with PE's that are physically located on different ASIC's. For example, a 2×2 array of ASIC's may be implemented on a PCB; and, North, East, West, and South I/O's of PE's physically located along the edges of NEWS arrays of adjacent ASIC's may be suitably interconnected. Still further, respective 2×2 arrays of ASIC's may be implemented on different PCB's; and, the North, East, West, and South I/O's of PE's physically located along the edges of the respective arrays of ASIC's may be suitably interconnected. In this way, the size of the NEWS array comprising the plurality of identical PE's can be increased to satisfy the processing requirements of the target application.

In this illustrative embodiment, each of the PE's 104 through 134 is connected to one and only one of the I/O's 0 through 15 of the RAM 102. For example, the PE's 104, 106, 108, and 110 are connected to the I/O's 15, 14, 13, and 12, respectively; the PE's 112, 114, 116, and 118 are connected to the I/O's 11, 10, 9, and 8, respectively; the PE's 120, 122, 124, and 126 are connected to the I/O's 7, 6, 5, and 4, respectively; and, the PE's 128, 130, 132, and 134 are connected to the I/O's 3, 2, 1, and 0, respectively, of the RAM 102. In a preferred embodiment, the PE's 104 through 134 utilize the I/O's 0 through 15 of the RAM 102 to access data in the RAM 102 in a bit-serial fashion.

Those of ordinary skill in this art will appreciate that the SIMD array processor 100 of FIG. 1 may be incorporated in a multi-dimensional processing system including, e.g., a command preprocessor interfaced with a processor controller that provides intermediary processing functions between the command preprocessor and the SIMD array processor 100.

Figure 2:
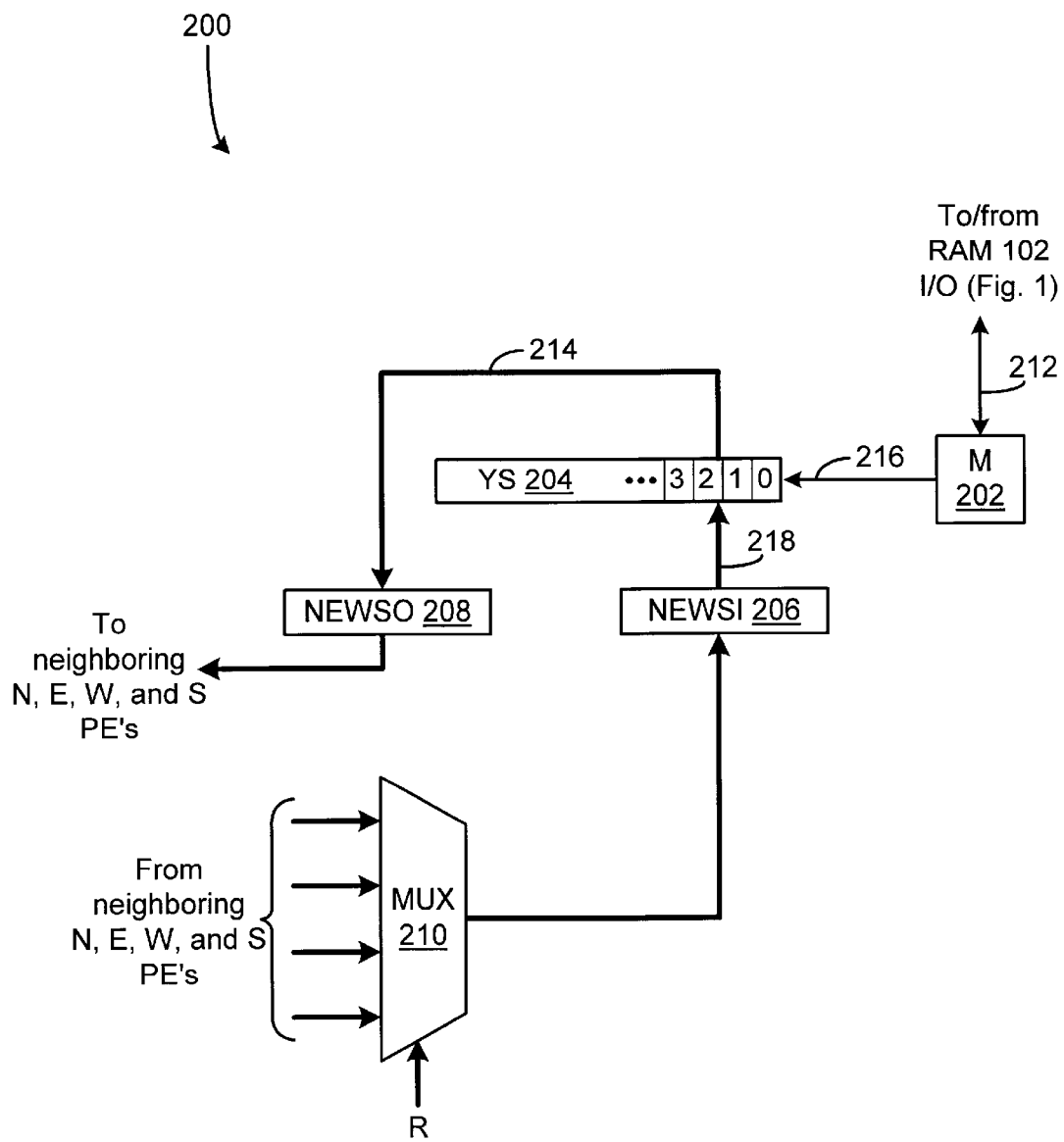
FIG. 2 is a block diagram depicting a processing element included in the SIMD array processor of FIG. 1.

FIG. 2 is a block diagram depicting an illustrative embodiment of a PE 200 in accordance with the present invention. In a preferred embodiment, the PE 200 is representative of each of the PE's 104 through 134 included in the SIMD array processor 100. Accordingly, the SIMD array processor 100 preferably includes a plurality of identical PE's such as the representative PE 200 interconnected in the 4×4 NEWS array configuration.

In the illustrated embodiment, the PE 200 includes a multi-bit data register YS 204. In a preferred embodiment, the data register YS 204 is 64-bits wide. It should be appreciated that the data register YS 204 can be used to store, e.g., a floating-point number or a signed/unsigned fixed-point integer. It should also be appreciated that the data register YS 204 can be used as a shift register. For example, the data register YS 204 may be used to shift in binary values in a bit-serial fashion from a memory buffer M 202 by way of a line 216. In a preferred embodiment, the memory buffer M 202 is a 1-bit wide memory buffer. Moreover, the data register YS 204 may be used to shift left binary values contained therein.

As described above, the PE's 104 through 134 (see FIG. 1) are preferably physically located on an ASIC to form a NEWS array to simplify I/O interconnections between the nearest neighboring PE's in the NEWS array. In a preferred embodiment, each of the PE's 104 through 134 reads four (4) bits of data directly (in parallel) from a nearest neighboring PE connected to its North, East, West, or South I/O while writing four (4) bits of data in parallel to an opposite neighboring PE. For example, the PE 114 may read four (4) bits of data in parallel from the PE 112 via the North I/O 140 while writing four (4) bits of data in parallel to the opposite neighbor PE 116 via the South I/O 142, and vice versa (see FIG. 1); and, the PE 114 may read four (4) bits of data in parallel from the PE 106 via the West I/O 146 while writing four (4) bits of data in parallel to the opposite neighbor PE 122 via the East I/O 144, and vice versa (see FIG. 1).

In the illustrated embodiment, the PE 200 (see FIG. 2) includes communication registers NEWS Input (NEWSI) 206 and NEWS Output (NEWSO) 208. In a preferred embodiment, each of the communication registers NEWSI 206 and NEWSO 208 is 4 bits wide for reading (writing) four (4) bits of data in parallel from (to) a nearest neighboring PE connected to its North, East, West, or South I/O. Specifically, the communication register NEWSI 206 receives four (4) data bits in parallel from one of the nearest neighboring North, East, West, and South PE's and preferably loads the four (4) data bits in parallel into the four (4) Least Significant Bit (LSB) positions (i.e., bit positions 0, 1, 2, and 3) of the data register YS 204 by way of a bus 218. Further, the data register YS 204 preferably loads four (4) data bits in parallel into the communication register NEWSO 208 by way of a bus 214 from its four (4) LSB positions for subsequent provision in parallel to one of the nearest neighboring North, East, West, and South PE's. The PE 200 includes a multiplexor (MUX) 210 that selects one of the 4-bit wide data buses coupled to respective communication registers NEWSO (not shown) of the nearest neighboring North, East, West, or South PE. The PE 200 also includes circuitry that enables the output of the communication register NEWSO 208 to drive only the bus that is connected to the nearest PE in the opposite direction. It is noted that the SIMD array processor 100 preferably includes a sequencer (not shown) for, e.g., decoding commands provided by a processor controller to obtain a stream of instructions and broadcasting the instruction stream to the NEWS array of PE's 104 through 134. Such a sequencer includes a control register for providing a 2-bit control word R that controls the selection of one of the above-mentioned four (4) data buses by the MUX 210 and the bus that the communication register NEWSO 208 drives with its output.

The PE 200 includes the memory buffer M 202, which preferably comprises a 1-bit wide memory buffer through which all data are transferred between the PE 200 and the RAM 102. In a preferred embodiment, the memory buffer M 202 included in each of the PE's 104 through 134 is connected to one and only one of the I/O's 0 through 15 of the RAN 102 for accessing a single bit of data during each memory cycle of the RAM 102. For example, a single data bit may be read from one of the I/O's by way of the memory buffer M 202 and provided to the data register YS 204.

As explained above, the PE's 104 through 134 (see FIG. 1) are preferably physically located on the same ASIC to form a NEWS array, and arrays of such ASIC's may be implemented on respective PCB's with North, East, West, and South I/O's of nearest neighboring PE's suitably interconnected. As a result, one or more of the nearest neighboring PE's with which a particular PE communicates may be physically located on a different ASIC and/or on a different PCB.

Those of ordinary skill in this art will appreciate that when a PE directly accesses a multi-bit data sample from a neighboring PE physically located on a different ASIC or a different PCB, a significant amount of time may be required for that data sample to propagate between the ASIC's or PCB's. In a preferred embodiment, the SIMD array processor 100 includes circuitry for generating a clock signal for latching four (4) bits of data in the respective communication registers NEWSI 206 and NEWSO 208; and, each ASIC preferably includes circuitry for generating respective clock signals used by the PE's 104 through 134 and the RAM 102 physically located thereon. The clock speed of the communication registers NEWSI 206 and NEWSO 208 is preferably one-fourth of the memory clock speed; and, the memory clock speed is preferably one-half of the PE clock speed. This means that the communication registers NEWSI 206 and NEWSO 208 can latch their respective inputs once every eight (8) PE clock cycles. As a result, the communication register NEWSO 208 holds its latched data for nearly eight (8) PE clock cycles, and the communication register NEWSI 206 reads four (4) bits of data from the communication register NEWSO of a neighboring PE (which may be physically located on a different ASIC or a different PCB) only after the data has settled for several consecutive PE clock cycles, thereby allowing sufficient time for the data to propagate.

The embodiments disclosed herein will be better understood with reference to the following illustrative example. In the following example, it is understood that the operating speed of the PE is twice that of the memory to allow the PE to perform two (2) sequential sets of operations on registers included therein while the memory either provides a single bit to the memory buffer M or receives a single bit from the memory buffer M.

This example comprises the transfer of a 12-bit operand "A" (i.e., "$A_{11}A_{10}A_9A_8A_7A_6A_5A_4A_3A_2A_1A_0$= 101001010011") from memory, to a memory buffer M0, to a data register YS0, and then to a communication register NEWSO0 of a first PE; and, the transfer of this operand from the communication register NEWSO0 to a communication register NEWSI1 and a data register YS1 of a second PE. In this example, it is understood that the first and second PE's are nearest neighboring PE's that may or may not be physically located on the same ASIC or the same PCB. It is further understood that the data registers YS0 and YS1 are 12-bit registers, the communication registers NEWSO0 and NEWSI1 are 4-bit registers, and the memory buffer M0 of the first PE is a 1-bit register. Further, at least the first PE includes circuitry configured for addressing a bit-serial column of memory. For example, binary values representative of the operand "A" may be stored in contiguous bit locations of the bit-serial column of memory. Moreover, the clock speed of the first and second PE's is understood to be twice that of the memory.

In this example, FIG. 3 depicts the contents of the YS0, NEWSO0, NEWSI1, and YS1 registers and the contents of the memory buffer M0 at the end of each memory cycle. During the first memory cycle, the memory provides the bit "$A_{11}$=1" (i.e., the Most Significant Bit (MSB) of the operand "A") to the memory buffer M0. Because the clock speed of the first PE is twice that of the memory, the bit "$A_{11}$=1" is transferred from the memory to the memory buffer M0 during the first half of the memory clock cycle, and the bit "$A_{11}$=1" is transferred from the memory buffer M0 to the LSB position of the data register YS0 during the second half of the memory clock cycle. FIG. 3 therefore depicts the contents of the memory buffer M0 as "1", and the respective contents of the YS0, NEWSO0, NEWSI1, and YS1 registers as "XXXXXXXXXXX1", "XXXX", "XXXX", "XXXXXXXXXXXX" ("X"="don't care") at the end of the first memory cycle. During the second memory cycle, the bit "$A_{10}$=0" is transferred from the memory to the memory buffer M0 during the first half of the memory clock cycle, and the first PE shifts the contents of the data register YS0 left by one bit position and loads the vacated bit position with the contents of the memory buffer M0 during the second half of the memory clock cycle. FIG. 3 therefore depicts the contents of the memory buffer M0 as "0", and the respective contents of the YS0, NEWSO0, NEWSI1, and YS1 registers as "XXXXXXXXXX10", "XXXX", "XXXX", "XXXXXXXXXXXX" at the end of the second memory cycle. During the third memory cycle, the bit "$A_9$=1" is transferred from the memory to the memory buffer M0 during the first half of the memory clock cycle, and the first PE shifts the contents of the data register YS0 left by one bit position and loads the vacated bit position with the contents of the memory buffer M0 during the second half of the memory clock cycle. FIG. 3 therefore depicts the contents of the memory buffer M0 as "1", and the respective contents of the YS0, NEWSO0, NEWSI1, and YS1 registers as "XXXXXXXXX101", "XXXX", "XXXX", "XXXXXXXXXXXX" at the end of the third memory cycle.

During the fourth memory cycle, the bit "$A_8$=0" is transferred from the memory to the memory buffer M0 during the first half of the memory clock cycle, and the first PE shifts the contents of the data register YS0 left by one bit position and loads the vacated bit position with the contents of the memory buffer M0 during the second half of the memory clock cycle. FIG. 3 therefore depicts the contents of the memory buffer M0 as "0", and the respective contents of the YS0, NEWSO0, NEWSI1, and YS1 registers as "XXXXXXXX1010", "XXXX", "XXXX", "XXXXXXXXXXXX" at the end of the fourth memory cycle. During the fifth memory cycle, the bit "$A_7$=0" is transferred from the memory to the memory buffer M0, and the data stored in the four (4) LSB positions of the data register Y0 are loaded into the communication register NEWSO0 during the first half of the memory clock cycle; and, the first PE shifts the contents of the data register YS0 left by one bit position and loads the vacated bit position with the contents of the memory buffer M0 during the second half of the memory clock cycle. FIG. 3 therefore depicts the contents of the memory buffer M0 as "0", and the respective contents of the YS0, NEWSO0, NEWSI1, and YS1 registers as "XXXXXXX10100", "1010", "XXXX", "XXXXXXXXXXXX" at the end of the fifth memory cycle. During the sixth memory cycle, the bit "$A_6$=1" is transferred from the memory to the memory buffer M0 during the first half of the memory clock cycle, and the first PE shifts the contents of the data register YS0 left by one bit position and loads the vacated bit position with the contents of the memory buffer M0 during the second half of the memory clock cycle. FIG. 3 therefore depicts the contents of the memory buffer M0 as "1", and the respective contents of the YS0, NEWSO0, NEWSI1, and YS1 registers as "XXXXXX101001", "1010", "XXXX", "XXXXXXXXXXXX" at the end of the sixth memory cycle.

During the seventh memory cycle, the bit "$A_5$=0" is transferred from the memory to the memory buffer M0 during the first half of the memory clock cycle, and the first PE shifts the contents of the data register YS0 left by one bit position and loads the vacated bit position with the contents of the memory buffer M0 during the second half of the memory clock cycle. FIG. 3 therefore depicts the contents of the memory buffer M0 as "0", and the respective contents of the YS0, NEWSO0, NEWSI1, and YS1 registers as "XXXXX1010010", "1010", "XXXX", "XXXXXXXXXXXX" at the end of the seventh memory cycle. During the first half of the eighth memory cycle, the bit "$A_4=1$" is transferred from the memory to the memory buffer M0, and the data stored in the communication register NEWSO0 is loaded into the communication register NEWSI1. During the second half of the eighth memory cycle, the first PE shifts the contents of the data register YS0 left by one bit position, and loads the vacated bit position with the contents of the memory buffer M0. FIG. 3 therefore depicts the contents of the memory buffer M0 as "1", and the respective contents of the YS0, NEWSO0, NEWSI1, and YS1 registers as "XXXX10100101", "1010", "1010", "XXXXXXXXXXXX" at the end of the eighth memory cycle. During the first half of the ninth memory cycle, the bit "$A_3=0$" is transferred from the memory to the memory buffer M0, the data stored in the four (4) LSB positions of the data register Y0 are loaded into the communication register NEWSO0, and the second PE loads the least significant four (4) bits of the data register YS1 with the contents of the communication register NEWSI1. During the second half of the ninth memory cycle, the second PE shifts the contents of the data register YS1 left by one bit position, and the first PE shifts the contents of the data register YS0 left by one bit position and loads the vacated bit position with the contents of the memory buffer M0. FIG. 3 therefore depicts the contents of the memory buffer M0 as "0", and the respective contents of the YS0, NEWSO0, NEWSI1, and YS1 registers as "XXX101001010", "0101", "1010", "XXXXXXX1010X" at the end of the ninth memory cycle.

During the first half of the tenth memory cycle, the bit "$A_2=0$" is transferred from the memory to the memory buffer M0. During the second half of the tenth memory cycle, the second PE shifts the contents of the data register YS1 left by one bit position, and the first PE shifts the contents of the data register YS0 left by one bit position and loads the vacated bit position with the contents of the memory buffer M0. FIG. 3 therefore depicts the contents of the memory buffer M0 as "0", and the respective contents of the YS0, NEWSO0, NEWSI1, and YS1 registers as "XX1010010100", "0101", "1010", "XXXXXX1010XX" at the end of the tenth memory cycle. During the first half of the eleventh memory cycle, the bit "$A_1=1$" is transferred from the memory to the memory buffer M0. During the second half of the eleventh memory cycle, the second PE shifts the contents of the data register YS1 left by one bit position, and the first PE shifts the contents of the data register YS0 left by one bit position and loads the vacated bit position with the contents of the memory buffer M0. FIG. 3 therefore depicts the contents of the memory buffer M0 as "1", and the respective contents of the YS0, NEWSO0, NEWSI1, and YS1 registers as "X10100101001", "0101", "1010", "XXXXX1010XXX" at the end of the eleventh memory cycle. During the first half of the twelfth memory cycle, the bit "$A_0=1$" is transferred from the memory to the memory buffer M0, and the data stored in the communication register NEWSO0 is loaded into the communication register NEWSI1. During the second half of the twelfth memory cycle, the second PE shifts the contents of the data register YS1 left by one bit position, and the first PE shifts the contents of the data register YS0 left by one bit position and loads the vacated bit position with the contents of the memory buffer M0. FIG. 3 therefore depicts the contents of the memory buffer M0 as "1", and the respective contents of the YS0, NEWSO0, NEWSI1, and YS1 registers as "101001010011", "0101", "0101", "XXXX1010XXXX" at the end of the twelfth memory cycle. At this time, it is noted that the YS0 register of the first PE contains the 12-bit operand "A".

During the first half of the thirteenth memory cycle, the data stored in the four (4) LSB positions of the data register Y0 are loaded into the communication register NEWSO0, and the second PE loads the least significant four (4) bits of the data register YS1 with the contents of the communication register NEWSI1. During the second half of the thirteenth memory cycle, the second PE shifts the contents of the data register YS1 left by one bit position. It is noted that because every bit of the operand "A" has been loaded into the data register YS0 during the first through twelfth memory cycles, the steps of shifting and loading the data register YS0 no longer need to be performed during the second half of the memory cycle. FIG. 3 therefore depicts the contents of the memory buffer M0 as "X", and the respective contents of the YS0, NEWSO0, NEWSI1, and YS1 registers as "101001010011", "0011", "0101", "XXX10100101X" at the end of the thirteenth memory cycle. During the fourteenth memory cycle, the second PE shifts the contents of the data register YS1 left by one bit position. FIG. 3 therefore depicts the contents of the memory buffer M0 as "X", and the respective contents of the YS0, NEWSO0, NEWSI1, and YS1 registers as "XXXXXXXXXXXX", "0011", "0101", "XX10100101XX" at the end of the fourteenth memory cycle. During the fifteenth memory cycle, the second PE shifts the contents of the data register YS1 left by one bit position. FIG. 3 therefore depicts the contents of the memory buffer M0 as "X", and the respective contents of the YS0, NEWSO0, NEWSI1, and YS1 registers as "XXXXXXXXXXXX", "0011", "0101", "X10100101XXX" at the end of the fifteenth memory cycle.

During the sixteenth memory cycle, the data stored in the communication register NEWSO0 is loaded into the communication register NEWSI1, and the second PE shifts the contents of the data register YS1 left by one bit position. FIG. 3 therefore depicts the contents of the memory buffer M0 as "X"; and, the respective contents of the YS0, NEWSO0, NEWSI1, and YS1 registers as "XXXXXXXXXXXX", "0011", "0011", and "10100101XXXX" at the end of the sixteenth memory cycle. Finally, during the seventeenth memory cycle, the data stored in the communication register NEWSI1 is loaded into the four (4) LSB positions of the data register YS1, thereby completing the transfer of the 12-bit operand "A" from the first PE to the second PE. FIG. 3 therefore depicts the contents of the memory buffer M0 as "X", and the respective contents of the YS0, NEWSO0, NEWSI1, and YS1 registers as "XXXXXXXXXXXX", "0011", "0011", "101001010011" at the end of the seventeenth memory cycle. At this time, it is noted that the YS1 register of the second PE contains the 12-bit operand "A".

In this illustrative example, it should be understood that the step of loading in parallel the data stored in the communication register NEWSO0 of the first PE into the communication register NEWSI1 of the second PE is performed concurrently with the process of serially reading the operand "A" from the memory during the eighth and twelfth memory cycles, as described above. It should also be understood that the communication register NEWSO0 of the first PE holds its data for nearly eight (8) PE clock cycles during the fifth through eighth memory cycles, the ninth through twelfth memory cycles, and the thirteenth through sixteenth memory cycles to allow the data to settle before loading it into the communication register NEWSI1 of the second PE. It is also noted that the transfer of the 12-bit operand "A" from the first to the second PE is completed in sixteen (17) memory cycles. In general, the SIMD array processor 100 transfers an n-bit operand between nearest neighboring PE's in (n+5) memory cycles. Such data transfers therefore have a latency of five (5) memory cycles, as represented by, e.g., the first through fourth, and seventeenth memory cycles of the above-described illustrative example.

Having described the above embodiment, other alternative embodiments or variations may be made. Specifically, it was described that each of the PE's 104 through 134 of the SIMD array processor 100 (see FIG. 1) is connected to one and only one of the I/O's 0 through 15 of the RAM 102 to provide 1-bit serial access to data contained therein, and that the data register YS 204 of the PE 200 (see FIG. 2) is preferably 64-bits wide. However, it should be understood that the SIMD array processor may alternatively provide n-bit serial access to data stored in memory, and the YS register of the PE may alternatively be m-bits wide, wherein "m" is preferably greater than "n". The memory buffer M of the PE may therefore be n-bits wide to provide the n-bit serial data access. The SIMD array processor of this alternative embodiment provides enhanced data transfer efficiency by loading in parallel data stored in the communication register NEWSO0 of a PE into the communication register NEWSI1 of a neighboring PE while serially reading at least one (1) bit of an operand from memory.

Those of ordinary skill in the art should further appreciate that variations to and modification of the above-described SIMD array processor may be made without departing from the inventive concepts disclosed herein. Accordingly, the present invention should be viewed as limited solely by the scope and spirit of the appended claims.

What is claimed is:

1. A single-instruction multiple-data array processor, comprising:

at least one memory; and a plurality of mesh-connected processing elements, each processing element including at least one memory buffer, at least one data register, at least one first communication register, and at least one second communication register, the memory buffer being adapted to transfer data between the memory and the data register, the first communication register being adapted to transfer data between the data register and the second communication register of a neighboring processing element, wherein each of the memory buffer, the data register, and the first and second communication registers has a width measured in bits, the width of the data register being greater than the width of the memory buffer and a multiple of the width of the memory buffer, and the data register being at least as wide as the first and second communication registers.

2. The single-instruction multiple-data array processor of claim 1 wherein the first communication register is adapted to transfer data to the second communication register of the neighboring processing element while the memory buffer transfers data between the memory and the data register.

3. The single-instruction multiple-data array processor of claim 1 wherein each processing element is adapted to perform data processing operations using at least a portion of the data registers while the memory buffer transfers data between the memory and at least one of the data registers.

4. The single-instruction multiple-data array processor of claim 1 wherein the memory buffer is further adapted to transfer data serially between the memory and the data register.

5. The single-instruction multiple-data array processor of claim 1 wherein the first communication register is further adapted to transfer data in parallel between the data register and the second communication register of the neighboring processing element.

6. The single-instruction multiple-data array processor of claim 1 wherein the memory includes a plurality of bit-serial columns of memory locations, and the memory buffer is further adapted to transfer data serially between the data register and a selected one of the bit-serial columns of memory.

7. The single-instruction multiple-data array processor of claim 1 wherein the memory is a synchronous dynamic random access memory.

8. The single-instruction multiple-data array processor of claim 1 wherein the plurality of mesh-connected processing elements comprises a NEWS array.

9. A method of operating a single-instruction multiple array processor, the array processor including at least one memory and a plurality of mesh-connected processing elements, each processing element including a memory buffer, a data register, a first communication register, and a second communication register, the method comprising the steps of:

transferring data between the memory and a first data register by a first memory buffer, the first data register and the first memory buffer being included in a first processing element; and transferring the data between the first data register and a second communication register by a first communication register, the first communication register being included in the first processing element and the second communication register being included in a second processing element, wherein a first portion of the data is transferred in the second transferring step while a second portion of the data is being transferred in the first transferring step.

10. The method of claim 9 wherein the data are transferred in parallel between the first data register and the first communication register in the second transferring step.

11. The method of claim 9 wherein the data are transferred between the memory and the first data register in the first transferring step in a bit-serial manner.

12. The method of claim 9 wherein the data comprise an n-bit data word and the data is transferred from the memory to the second communication register in the first and second transferring steps in (n+5) operating cycles of the memory.

* * * * *

UNITED STATES PATENT AND TRADEMARK OFFICE
CERTIFICATE OF CORRECTION

PATENT NO. : 6,728,863 B1
DATED : April 27, 2004
INVENTOR(S) : James H. Jackson et al.

It is certified that error appears in the above-identified patent and that said Letters Patent is hereby corrected as shown below:

Column 4,
Line 50, "RAN 102" should read -- RAM 102 --; and

Column 6,
Line 31, "XXXXXXX1010" should read -- XXXXXXXX1010 --.

Signed and Sealed this

Eighteenth Day of January, 2005

JON W. DUDAS
*Director of the United States Patent and Trademark Office*